(12) United States Patent
Lee et al.

(10) Patent No.: US 11,429,819 B2
(45) Date of Patent: Aug. 30, 2022

(54) PACKER CLASSIFICATION APPARATUS AND METHOD USING PE SECTION INFORMATION

(71) Applicant: HOSEO UNIVERSITY ACADEMIC COOPERATION FOUNDATION, Chungcheongnam-do (KR)

(72) Inventors: Tae Jin Lee, Seoul (KR); Young Joo Lee, Gyeonggi-do (KR)

(73) Assignee: HOSEO UNIVERSITY ACADEMIC COOPERATION FOUNDATION, Chungcheongnam-Do (KR)

(*) Notice: Subject to any disclaimer, the term of this patent is extended or adjusted under 35 U.S.C. 154(b) by 344 days.

(21) Appl. No.: 16/887,436

(22) Filed: May 29, 2020

(65) Prior Publication Data

US 2021/0027114 A1    Jan. 28, 2021

(30) Foreign Application Priority Data

Jul. 25, 2019    (KR) .......................... 10-2019-0090031

(51) Int. Cl.
*G06N 3/08*    (2006.01)
*G06K 9/62*    (2022.01)
*G06F 40/284*    (2020.01)
*G06F 16/903*    (2019.01)

(52) U.S. Cl.
CPC ..... *G06K 9/6267* (2013.01); *G06F 16/90344* (2019.01); *G06F 40/284* (2020.01); *G06K 9/6256* (2013.01); *G06N 3/08* (2013.01)

(58) Field of Classification Search
CPC ............... G06K 9/6267; G06K 9/6256; G06F 16/90344; G06F 40/284; G06F 21/56; G06N 3/08
USPC .......................................................... 706/25
See application file for complete search history.

(56) References Cited

U.S. PATENT DOCUMENTS

2022/0004631 A1* 1/2022 Otsuka ...................... G06F 8/75

* cited by examiner

*Primary Examiner* — Charlotte M Baker
(74) *Attorney, Agent, or Firm* — The PL Law Group, PLLC

(57) ABSTRACT

A packer classification apparatus extracts features based on a section that holds packer information from files and classifies packers using a Deep Neural Network(DNN) for detection of new/variant packers. A packer classification apparatus according to an embodiment uses PE section information. packer classification apparatus includes a collection classification module collecting a data set and classifying data by packer type to prepare for a model learning, a token hash module tokenizing a character string obtained after extracting labels and section names of each data and combining the section names, and obtaining a certain standard output value using Feature Hashing, and a type classification module generating a learning model after learning the data set with a Deep Neural Network(DNN) algorithm using extracted features, and classifying files for each packer type using the learning model after extracting features for the files to be classified.

8 Claims, 2 Drawing Sheets

PACKER CLASSIFICATION APPARATUS AND METHOD USING PE SECTION INFORMATION

STATEMENT REGARDING GOVERNMENT SPONSORED APPLICATION

This application is financially supported by Project No. 2019-0-00026 awarded by Business of Strengthening infra for national public information protection Program through Institute of Information & Communications Technology Planning & Evaluation (IITP), an affiliated institute of the National Research Foundation of Korea (NRT) funded by the Ministry of Science and ICT. The government support was made at a contribution rate of 1/1 for the research period of Apr. 1, 2019 through Dec. 31, 2022. The supervising institute was Electronics and Telecommunications Research Institute.

CROSS REFERENCE TO RELATED APPLICATION

The present application claims priority to Korean Patent Application No. 10-2019-0090031, filed Jul. 25, 2019, the entire contents of which is incorporated herein for all purposes by this reference.

BACKGROUND

1. Field of the Invention

The present disclosure relates to a packer classification apparatus and a method using PE section information. More particularly, the present disclosure relates to a packer classification apparatus and a method using PE section information that extracts features based on a section that holds packer information from files and classifies packers using a Deep Neural Network(DNN) for detection of new/variant packers.

2. Description of the Related Art

Packers reduce size by compressing an executable code and prevent an internal code and a reverse engineering. When performing packing, there are section names created for each packer in files. Most packer detection methods may detect only when a pattern can be found based on a signature.

The packer used for the malignant code uses a new packer that is not previously known so that it cannot be easily unpacked. Most unknown packers are variant packers created based on previously used packers.

When packing is applied to files, it is difficult to grasp the data of the part that interprets the code of a file using static analysis. However, in case of a file packed with the same packer, a pattern of a section, which is created when packing is performed for each packer, appears. Therefore, when classifying files by similar packer type, the files with packing technology may be classified efficiently to enable static analysis.

SUMMARY

The present disclosure is directed to providing a packer classification apparatus and a method using PE section information that extracts features based on a section that holds packer information from files and classifies packers using a Deep Neural Network(DNN) for detection of new/variant packers.

A packer classification apparatus using PE section information according to an exemplary embodiment of the present disclosure may include: a collection classification module collecting a data set and classifying data by packer type to prepare for model learning; a token hash module tokenizing a character string obtained after extracting labels and section names of each data and combining the section names, and obtaining a certain standard output value using Feature Hashing; and a type classification module generating a learning model after learning the data set with a Deep Neural Network(DNN) algorithm using extracted features, and classifying files by packer type using a learning model after extracting features for the files to be classified.

A packer classification method using PE section information according to an exemplary embodiment of the present disclosure may include: (A) a step in which a collection classification module collects a data set, classifies data by packer type, and prepares for a model learning; (B) a step in which a token hash module tokenizes a character string obtained after extracting labels and section names of each data and combining the section names, and obtains a certain standard output value using Feature Hashing; and (C) a step in which a type classification module generates a learning model after learning the data set with a Deep Neural Network(DNN) algorithm using extracted features, and classifies files by packer type using the learning model after extracting features for the files to be classified.

DETAILED DESCRIPTION

Figure 1:
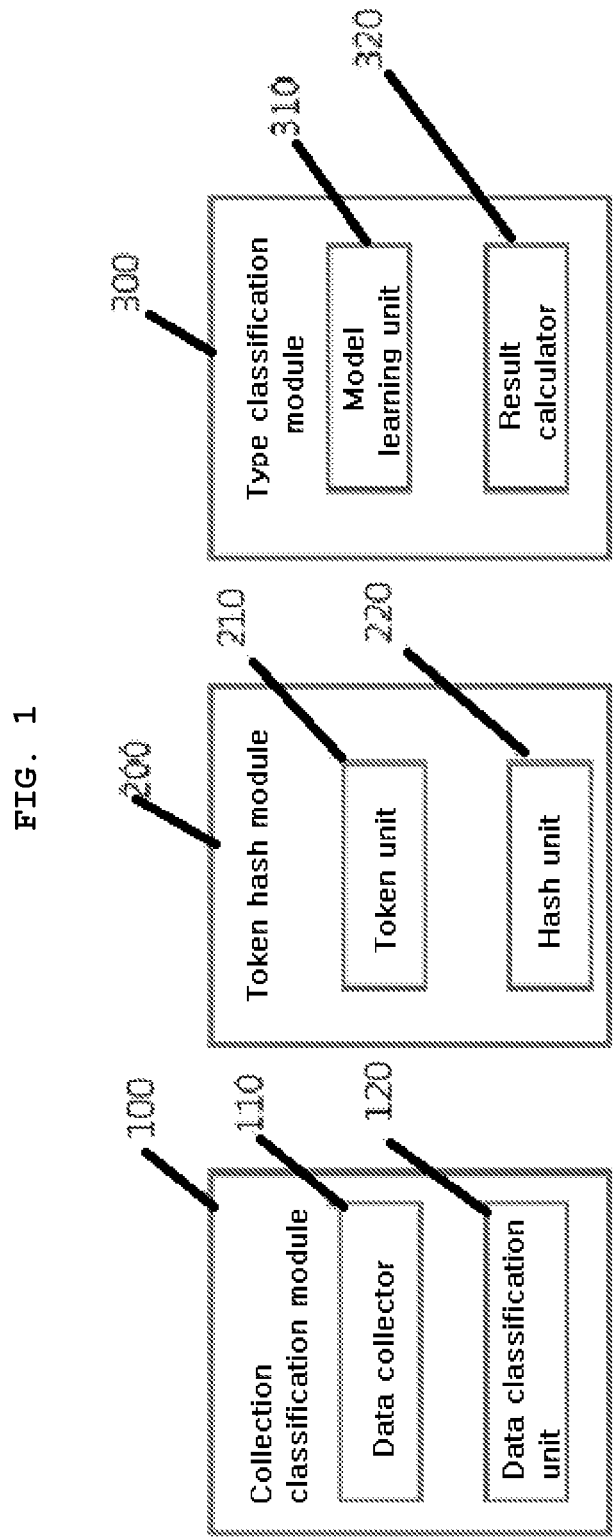
FIG. 1 is a schematic diagram illustrating a packer classification apparatus using PE section information, in accordance with an embodiment of the present disclosure.

FIG. 1 is a schematic diagram illustrating a packer classification apparatus using PE section information, in accordance with an embodiment of the present disclosure.

Referring to FIG. 1, a packer classification apparatus using PE section information according to an embodiment of the present disclosure may include a collection classification module 100, a token hash module 200, and a type classification module 300.

The collection classification module 100 may include a data collector 110 and a data classification unit 120, the token hash module 200 may include a token unit 210 and a hash unit 220, and the type classification module 300 may include a model learning unit 310 and a result calculator 320.

The collection classification module 100 collects a data set, classifies data by packer type, and prepares for a model learning.

In more detail, the data collector 110 collects the data set, and the data classification unit 120 classifies data by packer type and prepares for the model learning.

Next, the token hash module 200 tokenizes a character string, which is obtained after extracting labels (packer names) and section names of each data and combining the section names, into N-gram and obtains a certain standard output value using Feature Hashing.

In more detail, the token unit 210 tokenizes the character string, which is obtained after extracting the labels (packer names) and the section names of each data and combining the section names, into N-gram.

The hash unit 220 obtains a certain standard output value using Feature Hashing.

Next, the type classification module 300 generates a learning model after learning the data set with a Deep Neural Network(DNN) algorithm using extracted features, and classifies files by packer type using the learning model after extracting features for the files to be classified.

In more detail, the model learning unit 310 generates the learning model after learning the data set with the DNN algorithm using extracted features.

The result calculator 320 classifies the files by packer type using the learning model after extracting features for the files to be classified.

Figure 2:
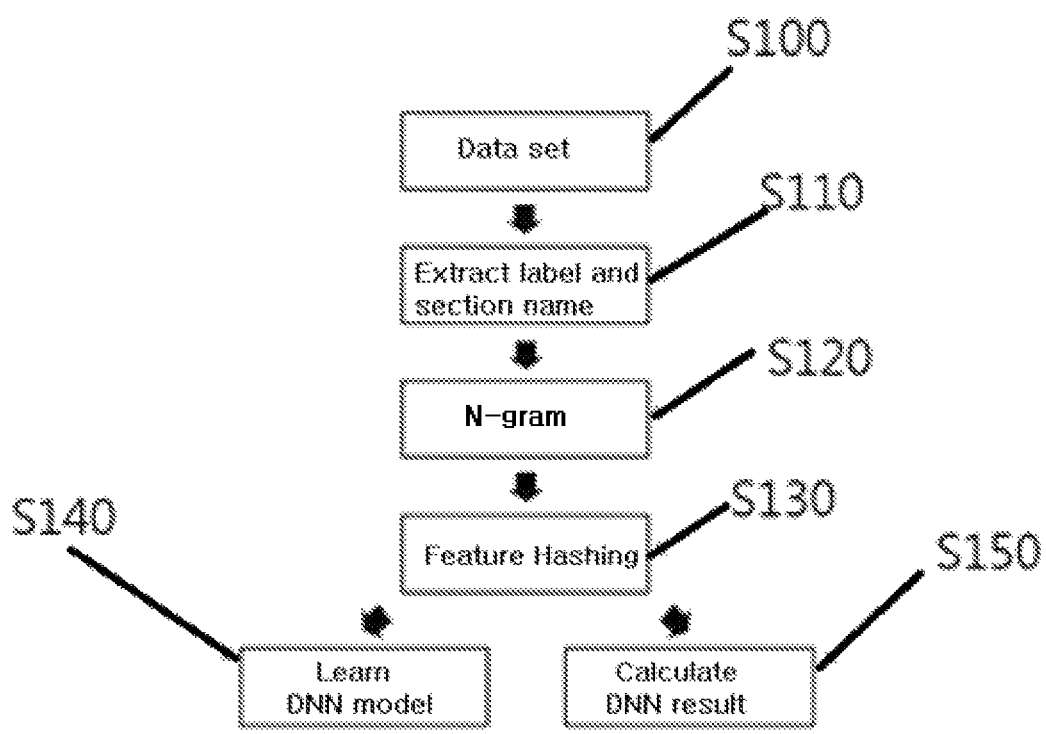
FIG. 2 is a flow chart illustrating a packer classification method using PE section information, in accordance with an embodiment of the present disclosure.

FIG. 2 is a flow chart illustrating a packer classification method using PE section information, in accordance with an embodiment of the present disclosure.

Referring to FIG. 2, in the packer classification method using PE section information according to an exemplary embodiment of the present disclosure, first, the collection classification module collects a data set and classifies data by packer type to prepare for model learning at step S100.

At step S110, the token hash module extracts the labels (packer names) and the section names of each data and combines the section names.

The conventional signature-based packer detection technology has difficulties in detecting variant packers made by changing the conventional packers. To solve this problem, Deep Learning is used, packer names are used as the labels for learning Deep Learning, and section names are used as features.

Next, the token hash module tokenizes the obtained character string into N-gram at step S120 and obtains a certain standard output value using Feature Hashing at step S130.

In the present disclosure, 2-gram is performed as an example. The reason N is set to 2 is because the length of each section name is different, and to distinguish letters rather than to distinguish each section name.

TABLE 1

| example: | .text.data.rsrc |
|---|---|
| 2-gram | ".t", "te", "ex", "xt", "t.", ..., "rc" |

Each file has different section names and different lengths, so Feature Hashing is performed to make the data set into data with a fixed length.

A sha255 hash and a modulo operation are performed for each token.

The result value of the remainder is stacked with a fixed number of indexes on a stack.

TABLE 2

| example: | .text.rsrc.reloc | | | | | | | |
|---|---|---|---|---|---|---|---|---|
| .t | (3c247ed ... 6ec1ff5b0) mod 100 = 44 | | | | | | | |
| te | (2d6c9a9 ... f61b918dd) mod 100 = 44 | | | | | | | |
| ex | (5312fb6 ... 18d22e9fa) mod 100 = 5 | | | | | | | |
| ... | | | | | | | | |
| oc | (5f751e0 ... 76297ef5c) mod 100 = 23 | | | | | | | |
| ↓ | | | | | | | | |
| index | 0 | 1 | ... | 5 | ... | 23 | ... | 44 |
| | 0 | 0 | | 1 | | 1 | | 2 |

Next, the type classification module generates the learning model after learning the data set with the DNN algorithm using extracted features at step S140.

After extracting features that have undergone the above-mentioned process for the files to be classified by the type classification module, the files may be classified by packer type using the learning model at step S150.

According to the DNN-based packer classification in accordance with the present disclosure, unlike a conventional packer detection method which can be easily avoided by modifying signature shape, a new method of classifying packers may be utilized and complemented by applying Deep Learning to the method, thereby having an advantage detecting not only conventional packers but also modified packers.

While the present invention has been described with respect to the specific embodiments, it will be apparent to those skilled in the art that various changes and modifications may be made without departing from the spirit and scope of the invention as defined in the following claims.

What is claimed is:

1. A packer classification apparatus using PE section information comprising:
   a collection classification module collecting a data set and classifying data by packer type to prepare for a model learning;
   a token hash module tokenizing a character string obtained after extracting labels and section names of each data and combining the section names, and obtaining a certain standard output value using Feature Hashing; and
   a type classification module generating a learning model after learning the data set with a Deep Neural Network (DNN) algorithm using extracted features, and classifying files for each packer type using the learning model after extracting features for the files to be classified.

2. The packer classification apparatus using PE section information of claim 1, wherein the collection classification module comprises:
   a data collector collecting the data set; and
   a data classification unit classifying data by packer type and preparing for the model learning.

3. The packer classification apparatus using PE section information of claim 1, wherein the token hash module comprises:
   a token unit tokenizing the character string, which is obtained after extracting the labels and the section names of each data and combining the section names, into N-gram; and
   a hash unit obtaining a certain standard output value of the tokenized character string using Feature Hashing.

4. The packer classification apparatus using PE section information of claim 1, wherein the type classification module comprises:
   a model learning unit generating a learning model after learning the data set with the DNN algorithm using extracted features; and
   a result calculator classifying the files by packer type using the learning model after extracting features for the files to be classified.

5. A packer classification method using PE section information, the method comprising:
   (A) a step in which a collection classification module collects a data set, classifies data by packer type, and prepares for a model learning;

(B) a step in which a token hash module tokenizes a character string obtained after extracting labels and section names of each data and combining the section names, and obtains a certain standard output value using Feature Hashing; and (C) a step in which a type classification module generates a learning model after learning the data set with a Deep Neural Network (DNN) algorithm using extracted features, and classifies files by packer type using the learning model after extracting features for the files to be classified.

6. The packer classification method using PE section information of claim 5,
wherein the step (A) comprises:
(A-1) a step in which the collection classification module collects the data set; and
(A-2) a step in which the collection classification module classifies data by packer type to prepare for the model learning.

7. The packer classification method using PE section information of claim 5, wherein the step (B) comprises:
(B-1) a step in which the token hash module tokenizes the character string, which is obtained after extracting the labels and the section names of each data and combining the section names, into N-gram; and
(B-2) a step in which the token hash module obtains a certain standard output value of the tokenized character string using Feature Hashing.

8. The packer classification method using PE section information of claim 5, wherein the step (C) comprises:
(C-1) a step in which the type classification module generates the learning model after learning the data set with the DNN algorithm using extracted features; and
(C-2) a step in which the type classification module classifies files by packer type using the learning model after extracting features for the files to be classified.

* * * * *